(No Model.)

N. JEWETT.
APPARATUS FOR WASHING AND GRADING GRAVEL, &c.

No. 470,681. Patented Mar. 15, 1892.

on line 2-2.

Witnesses
Raymond H. Barnes
N. R. Kennedy

Inventor
Nathan Jewett
By Phil. T. Dodge, Attorney

UNITED STATES PATENT OFFICE.

NATHAN JEWETT, OF CHICAGO, ILLINOIS.

APPARATUS FOR WASHING AND GRADING GRAVEL, &c.

SPECIFICATION forming part of Letters Patent No. 470,681, dated March 15, 1892.

Application filed September 4, 1891. Serial No. 404,737. (No model.)

*To all whom it may concern:*

Be it known that I, NATHAN JEWETT, of Chicago, county of Cook, and State of Illinois, have invented a new and useful Improvement in Apparatus for Washing and Grading Gravel, &c., of which the following is a specification.

My invention relates to a machine for washing and separating gravel, sand, &c., the construction being such that the operation of the machine is continuous and automatic, and that the water serves as the sole means of carrying the material through and from the apparatus, thus dispensing with the use of an engine or other motor.

My apparatus comprises a series of screens arranged in a zigzag fashion to deliver one upon another, and combined with means whereby a copious and constant supply of water is delivered into the apparatus and conducted therethrough from one end to the other in such manner as to carry along with it the material under treatment and effect the discharge of the matters lodging upon the respective screens automatically from the apparatus, the original volume of water continuing its course through the successive screens, so that it acts repeatedly to effect the discharge of the coarser grades of materials as they are separated one after another.

It is to be noted as a characteristic and novel feature of my apparatus that it is so organized that the water flowing swiftly therethrough in large volume serves to effect the separation and the discharge of the graded materials, and that these results are effected without the use of movable screens and without the application of driving power to the apparatus in any form or manner.

Figure 1:
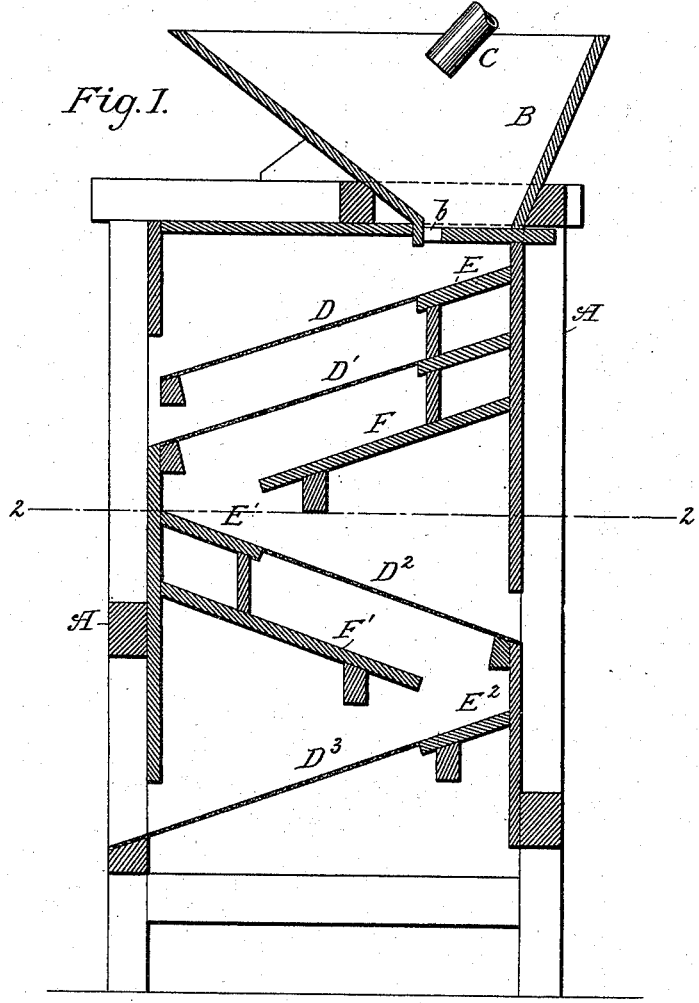
Figure 2:
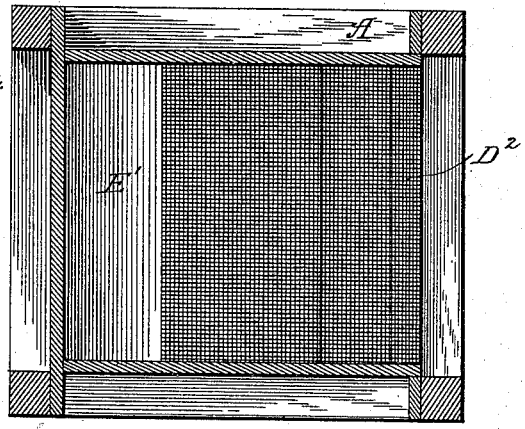

In the accompanying drawings, Figure 1 is a vertical cross-section through an apparatus constructed on my plan. Fig. 2 is a horizontal section of the same on the line 2 2.

Referring to the drawings, A represents a rigid upright frame, which may be of any suitable construction.

B is a hopper mounted on top of the frame to receive the crude material to be treated and provided at the bottom with a discharge-opening $b$ and with a slide or gate to control the rate of discharge.

C is a pipe connected with a pump, dam, or other source of supply and arranged to deliver constantly into the hopper a volume of water sufficient to wash and agitate the mass therein and insure the constant flow of the material with the water through the bottom opening.

D and D' are two fixed inclined screens located below the hopper and one beneath the other, their inclination being such that the coarse materials arrested by them will pass downward over their surfaces and be discharged at their lower ends from the machine through the openings provided for the purpose. $D^2$ is a similar fixed screen arranged at a lower level and inclined in the opposite direction to deliver its tailings through the side of the machine, and $D^3$ is a fourth and similar screen arranged at a still lower level and inclined in the same direction as those of the top. There may be any suitable number of these screens arranged successively in reverse direction and each of finer mesh than the one preceding.

E E', &c., are inclined deflector or spreader boards, arranged one at the upper end of each screen, so as to form in effect a continuation of its surface.

F F' are inclined conductor or chute boards arranged below the respective screens and each extending to a point near the lower end of the screen. The water and solid matter descending from the hopper are received upon the upper deflector-board E, by which they are spread or distributed and directed upon the upper screen, the coarse material arrested by this screen being acted upon by the water, and the material falling from above is urged downward over the surface of the screen and discharged at the tail, while the water and finer matters continue downward through the screens. The second screen, which is of slightly finer mesh than the first, effects a second separation and discharges the coarse material at the tail, while the fine matters and the water passing through the screen are received upon the chute-board below and by it directed against the deflector at the head of the next and reversely-arranged screen, which, separating the coarse material, permits the finer matters and water to pass therethrough to the next chute-board, by which they are delivered to the final screen. It will be observed that all the water and the fine material pass through all the screens and that the inclination of the screens is sufficient to insure the discharge of the coarse material therefrom without the necessity of shaking them or providing them with mechanical clearers. It is also to be observed that the entire volume of water which is delivered into the hopper is carried through the entire apparatus and thus used repeatedly for cleansing the material and for delivering the same through and over the screens.

In handling as I do a large volume of water it is found that the deflector-boards at the ends of the screens are of great service, in that they check the violence of the water and cause the same to flow backward with a reverse motion over the succeeding screens. If the water and the contained material were precipitated directly and violently upon the upper ends of the screens, they would be rapidly destroyed and there would be danger of the material being lodged immovably in the openings of the screen in such manner as to impair their action.

Having thus described my invention, what I claim is—

1. In an apparatus for washing and grading gravel, &c., a series of reversely-arranged graded screens, each discharging from the apparatus at the tail, in combination with inclined chute-boards or conductors arranged beneath the respective screens to conduct the water passing through one screen to the head of the next, deflectors at the heads of the screens to distribute the descending water and gravel thereover, and means for delivering a constant supply of water into the top of the apparatus, whereby the water is caused to sweep the material repeatedly through and over the screens and to discharge the matters lodging on the screens from the apparatus without the employment of a motor or movable parts.

2. In an apparatus for washing and grading gravel, &c., the combination of a frame, a series of fixed steeply-inclined reversely-arranged screens, each adapted to deliver its tailings directly from the machine, intermediate chute-boards by which the water and solid matters falling through each screen are directed to the head of the next, and means for delivering a continuous supply of water through the entire series of screens.

3. In an apparatus for washing and grading gravel, &c., the combination of a rigid frame, a hopper thereon provided with a gate to control the discharge, means for supplying water constantly to said hopper, a series of reversely-inclined screens fixed in position below the hopper, each discharging at the tail from the apparatus, and a series of reversely-inclined chute-boards underlying the screens and adapted to direct the entire volume of water and solid matters falling through one screen to the head of the next, whereby the water is caused to effect the gradation and discharge of the material.

In testimony whereof I hereunto set my hand, this 30th day of July, 1891, in the presence of two attesting witnesses.

NATHAN JEWETT.

Witnesses:
  CALVIN F. TAYLOR,
  W. E. KIRKPATRICK.